United States Patent
Hu et al.

(10) Patent No.: US 11,301,727 B2
(45) Date of Patent: Apr. 12, 2022

(54) EFFICIENT IMAGE CLASSIFICATION METHOD BASED ON STRUCTURED PRUNING

(71) Applicant: Zhejiang University, Zhejiang (CN)

(72) Inventors: Haoji Hu, Zhejiang (CN); Xiang Li, Zhejiang (CN); Huan Wang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 134 days.

(21) Appl. No.: 16/945,626

(22) Filed: Jul. 31, 2020

(65) Prior Publication Data
US 2021/0049423 A1 Feb. 18, 2021

(30) Foreign Application Priority Data
Jul. 31, 2019 (CN) .......................... 201910701012.X

(51) Int. Cl.
  *G06K 9/62* (2022.01)
  *G06N 3/08* (2006.01)
  *G06T 3/40* (2006.01)

(52) U.S. Cl.
  CPC ......... *G06K 9/6268* (2013.01); *G06K 9/6256* (2013.01); *G06K 9/6261* (2013.01); *G06K 9/6262* (2013.01); *G06N 3/082* (2013.01); *G06N 3/084* (2013.01); *G06T 3/4023* (2013.01)

(58) Field of Classification Search
  CPC .. G06K 9/6268; G06K 9/6256; G06K 9/6261; G06K 9/6262; G06K 9/4628; G06N 3/082; G06N 3/084; G06N 3/0454; G06T 3/4023
  USPC ...................................................... 382/181
  See application file for complete search history.

(56) References Cited

U.S. PATENT DOCUMENTS

2019/0244061 A1* 8/2019 Gupta .................. G06K 9/6267
2020/0302265 A1* 9/2020 Wang .................. G06K 9/6271

* cited by examiner

*Primary Examiner* — Juan A Torres
(74) *Attorney, Agent, or Firm* — CRGO Global; Steven M. Greenberg

(57) ABSTRACT

The present invention provides an efficient image classification method based on structured pruning, which incorporates a spatial pruning method based on variation regularization, including steps such as image data preprocessing, inputting images to neural network, image model pruning and retraining, and new image class predication and classification. The present invention adopts a structured pruning method that removes unimportant weight parameters of the original network model and reduces unnecessary computational and memory consumptions caused by the network model in image classification to simplify the image classifier, and then uses the sparsified network model to predict and classify new images. The simplified method according to the present invention improves the original network model in image classification efficiency by nearly two times, costs about 30% less memory consumption and produces a better classification result.

10 Claims, 3 Drawing Sheets

EFFICIENT IMAGE CLASSIFICATION METHOD BASED ON STRUCTURED PRUNING

CROSS REFERENCE TO RELATED APPLICATIONS

This application claims priority under 35 U.S.C. § 119(a) to Chinese patent application number 201910701012.X, filed on Jul. 31, 2019, the entire teachings of which are incorporated herein by reference.

BACKGROUND OF THE INVENTION

Field of the Invention

The present disclosure relates to the field of image processing and computer vision, and in particular, to an efficient image classification method based on structured pruning.

Description of the Related Art

In recent years, deep learning has been used for multilayer information processing of hierarchical structures in unsupervised feature learning and image classification, emulating the learning and analyzing capabilities of a human brain, forming a neural network, and analyzing and understanding external inputs in the same way that the brain would. In comparison with conventional image classification methods that obtain the underlying features of an image based on shallow learning, deep learning uses a designed network structure to learn the hierarchical structural features of an image completely from the training data, which allows for extraction of abstract features closer to the high-level semantics of the image and delivers a performance far exceeding that of the conventional methods in image classification.

Deep Convolutional Neural Network (CNN) has shown great benefit in feature representation. As the depth of the network deepens, the extracted features become more and more abstract, and closer and closer to the theme semantics of the image. Therefore, by performing convolution and pooling operations alternately to gradually extracting high-level features of the image, and using a neural network to classify the features so as to classify the image, CNN shows great benefit in the field of image classification. With the increasing demand for image classification performance, deep CNN-based image classification algorithms have become the basis for high-performance image classification architecture design. However, CNN usually requires a lot of computational and storage resources; especially, when using a large-scale network learned from a large amount of data in image classification, CNN is inefficient, consumes a huge amount of memory and costs excessive computational and storage resources, which greatly hinders the applicability of CNN in image classification algorithms.

BRIEF SUMMARY OF THE INVENTION

In order to solve the problem above, the present disclosure provides an efficient image classification method based on structured pruning, which removes unimportant parameters of the network model to reduce unnecessary computational and storage consumptions caused by the network model in image classification, so that the sparsified network model is more efficient in image classification, produces a better classification result and consumes less memory, thereby efficiently saving computational and storage resources and increasing the applicability of CNN in image classification algorithms.

The object of the present disclosure can be achieved by the following technical solutions: an efficient image classification method based on structured pruning, including the following steps:

(1) obtaining a training dataset and a test dataset of images; class-labeling images of the training dataset and the test dataset;

(2) preprocessing all the images of the training dataset and the test dataset;

(3) iteratively training, by using a pre-trained neural network model as an original image classifier and inputting the pre-processed images from step (2) to the neural network in batches; and pruning the original network model during the training, the pruning comprising the following steps:

(3.1) for each convolutional layer of the model, modeling a four-dimensional tensor $W_{N*C*H*W}$, where N is the number of convolution kernels, C is the number of channels of the convolution kernels, and H and W are the height and width of the convolution kernel respectively;

(3.2) dividing the weights of the convolution kernels into weight groups according to the dimensions of H and W, so that weights at the same spatial position in all the channels of all the convolution kernels in a convolutional layer are grouped into an independent weight group g;

(3.3) according to a user-specified compression or speed-up ratio of the model, determining a target sparsity rate for each layer of the network model; setting a uniform regularization upper limit target_reg to all the weight groups, and assigning a regularization factor $\lambda_g$ to each independent weight group where all $\lambda_g$ are initialized to 0;

(3.4) setting a criterion to measure a sparsity importance of each weight group in the network weight matrix; sorting the weight groups in ascending order according to the criterion and obtaining an importance rank for each weight group;

(3.5) gradually assigning regularization variations $\Delta\lambda_g$ to respective weight groups, according to the importance rank of each weight group g; continuously updating the regularization factor $\lambda_g$ of each weight group; permanently deleting weights of a weight group when a regularization factor $\lambda_g$ of the weight group reaches the preset regularization upper limit target_reg;

(3.6) reshaping irregularly shaped sparse convolution kernels obtained from the spatial pruning into regular sparse convolution kernels by spatial regularization;

(3.7) deleting pixels on an input feature map in the same directions as the deleted weights on the regular sparse convolution kernels, to ensure the size of an output feature map is not changed;

(3.8) when a sparsity rate of a layer reaches the preset target sparsity rate, stopping automatically the regularization pruning of the layer; when all the layers reach their preset sparsity rates, determining completion of the pruning;

(4) retraining the sparsified network model where the deleted weights are fixed and not updated, and the other parameters are iteratively trained; when image classification accuracy of the retrained model no longer increases, stopping the retraining and outputting a sparse network model;

(5) using the sparse network model as a new image classifier, to predict class-labels of the test dataset and thus classify the new images.

Further, in step (2) the preprocessing comprises:

first, unifying the sizes of all the images to 224×224, by a resizing operation;

then, performing mean removal, to remove, for each feature to be trained, a mean value across all training images from the feature;

finally, scaling features of the images to a same range by normalization.

Further, step (3.2) comprises:

dividing into weight groups according to the two dimensions, height H and width W, of the convolution kernel of the four-dimensional tensor, so that weights (N, C, : , :) at the same spatial position in all the channels of all the convolution kernels are grouped into an independent weight group, totaling H*W weight groups.

Further, the determining a target sparsity rate for each layer of the network model in step (3.3) comprises:

when a parameter compression ratio of the model is specified, first calculating the number of parameters N*C*H*W for each parameter layer and the total number of parameters P of the model, calculating a ratio $\alpha_l$ of the number of parameters of a layer to the total number of parameters for each layer; then, calculating the number of parameters to be removed P' from the model according to the preset compression ratio, calculating the number of parameters to be removed $P_1'$ for each layer using $\alpha_l*P'$, to obtain the target sparsity rate for each layer of the network model;

similarly, when a speed-up ratio of the model is specified, first calculating a floating point operations per second (GFLOPs) for each layer and a total GFLOPs of the model; then determining a GFLOPs to be reduced for the model according to the specified speed-up ratio, calculating a GFLOPs to be reduced for each layer, to obtain the target sparsity rate for each layer.

Further, the criterion to measure a sparsity importance in step (3.4) is averaged L1-norm; and at each iteration, the weight groups are sorted in ascending order according to L1-norm, then, an average rank across the first N iterations is calculated using a function $$\bar{r}_{avg} = \frac{1}{N}\sum_{n=1}^{M} r_n,$$

and the average ranks $\bar{r}_{avg}$ are sorted again, to obtain a final importance rank r for each weight group.

Further, the assigning regularization variations $\Delta\lambda_g$ in step (3.5) comprises:

determining regularization variations of respective weight groups according to the importance rank r, assigning regularization variations $\Delta\lambda_g$ to respective weight groups using the centrally-symmetric continuous function $$\Delta\lambda_g(r) = \begin{cases} Ae^{-\alpha r} & r \leq N_c \\ 2uA - Ae^{-\alpha(2N_c-r)} & r > N_c \end{cases},$$

where A and u are manually-set hyper-parameters, representing the penalty that a weight group with the lowest rank obtained from a sorting receives and the ratio of the penalty that a weight group with a threshold rank $RN_g$ receives to A; $\alpha$ and $N_c$ are known parameters where $\alpha$ represents the curvature of the function curve, obtainable using the equation $$\alpha = \frac{\log(2) - \log(u)}{RN_g},$$

$N_c$ represents the center of symmetry of the function, obtainable using the equation $$N_c = -\frac{\log(u)}{\alpha}.$$

Further, the updating the regularization factor $\lambda_g$ in step (3.5) comprises:

at each iteration, gradually updating the regularization factor $\lambda_g$ of each weight group by adding the regularization variation $\Delta\lambda_g$ of the weight group to its corresponding regularization factor, to obtain a new regularization factor $\lambda_g^{new}$ for each weight group; when $\lambda_g^{new}$ reaches the preset regularization upper limit target_reg, deleting the corresponding parameter group, to obtain a sparsified model.

Further, the spatial regularization in step (3.6) comprises:

for an irregularly shaped sparse convolution kernel generated in the sparse model, reshaping the irregularly shaped sparse convolution kernel by finding a regularly shaped sparse convolution kernel with the smallest difference from the irregularly shaped sparse convolution kernel using a function $V^{(i)} = \Sigma_{s=0}^{S}|M(s) - m^{(i)}(s)|$, where S is the number of weight groups, i.e., S=H×W, M(s) is the mask value of a spatial position s of the irregularly shaped sparse convolution kernel, and $m^{(i)}(s)$ is the mask value of an i-th sub-rectangle at a spatial position s in a regularly shaped convolution kernel, wherein the corresponding regularly shaped sparse convolution kernel is found by minimizing $V^{(i)}$.

Further, step (3.7) comprises:

dividing the regularly shaped sparse convolution kernel into four directions in terms of spatial dimensions: upper, lower, left, and right; similarly, dividing the input feature map into four directions in terms of spatial dimensions: upper, lower, left, and right; then, according to spatial-dimension directions of the deleted weights on the regularly shaped sparse convolution kernel, deleting pixels of the input feature map in the corresponding directions, so that the size of the output feature map is not changed.

Further, step (4) comprises:

for the sparsified network, labeling weights in the deleted weight groups by mask, and mask-labeling weight gradients of corresponding weight groups in backpropagation to ensure that in the retraining the weights in the deleted weight groups are not updated, and weights in the rest weight groups are iteratively updated; and during the training, evaluating an accuracy achieved by the model, and stopping the retraining and outputting a sparse network model with a highest accuracy when the accuracy by the retrained model no longer increases.

As compared with the prior art, the present disclosure has the following advantages:

(1) The image classification method according to the present disclosure is an image classification method based on a deep convolutional neural network, which reduces the number of training parameters mainly using image spatial information, to improve model training, and learns the hierarchical structural features of the image by a designed network structure, to extract abstract features closer to the high-level semantics of the image, thereby improving image classification accuracy and producing a better classification result as compared with the conventional image classification methods;

(2) The present disclosure simplifies the image classifier by removing redundant weight parameters in the network model, to reduce computational and memory consumptions in the image classification algorithm. This approach is applicable to the pruning of a vast majority of deep neural network models, and can effectively improve the spatial complexity of the image classifier and produce a better image classification result;

(3) In the pruning process, the present disclosure assigns different regularization factors to different weight groups in a convolutional layer of the neural network, gradually assigns different regularization variations to different weight groups according to the relative importance of the weight groups, and continuously updates the regularization factors of the weight groups. A weight is permanently deleted only when the regularization factor of the weight group reaches a specified regularization factor upper limit, in this way, unimportant weights in the network are removed more accurately;

(4) The spatial regularization approach provided in the pruning section of the present disclosure can reshape irregularly shaped sparse convolution kernels generated from spatial pruning into regularly shaped sparse convolution kernels, so that the sparsified network model can be sped up directly using an existing deep learning dataset, thereby significantly improving the efficiency of image classification;

(5) In the pruning process, in addition to using the spatial dimensions of convolution kernels as the basic pruning units, the present disclosure can also use the parameter rows or parameter columns of the two-dimensional matrix obtained by tensor unfolding as the basic pruning units. Therefore, the present disclosure provides more choices and greater flexibility.

DETAILED DESCRIPTION OF PARTICULAR EMBODIMENTS

The present disclosure will be described in detail in conjunction with the embodiments below.

Figure 1:
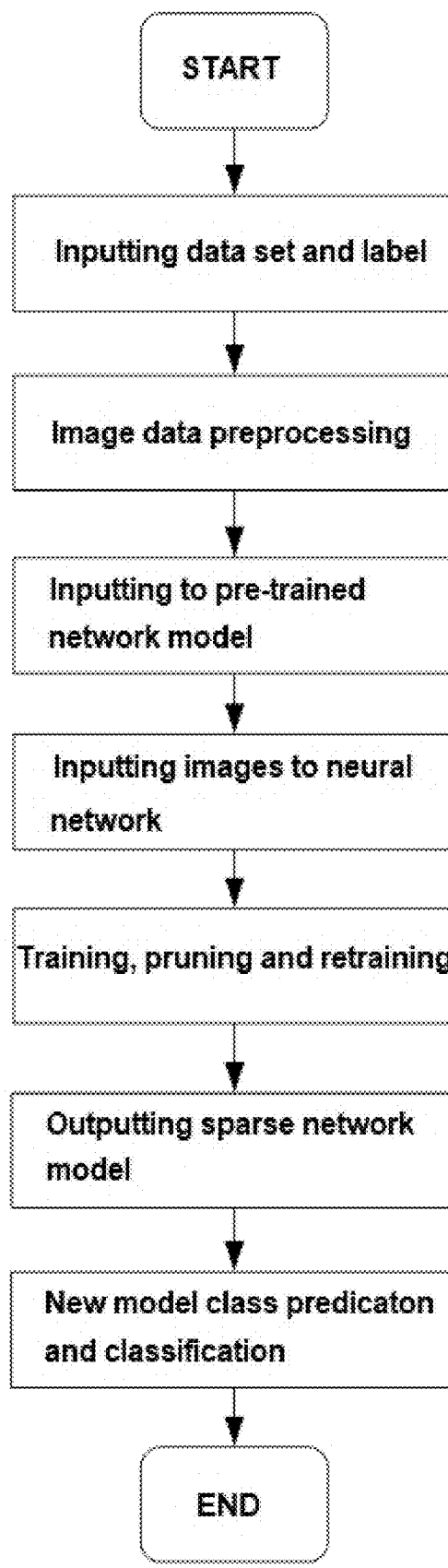
FIG. 1 is a flowchart of a general process according to an embodiment of the present disclosure.

The present disclosure provides an efficient image classification method based on structured pruning. FIG. 1 is a flowchart of the general process.

(1) Preparing a training dataset, a network structure configuration file, a training process configuration file, etc. Specifically, the training dataset contains about 1.2 million images from the ImageNet-2012 dataset, in a total of 1,000 classes. The test dataset contains new image data different from that of the training dataset, totaling 5,000 images in 1,000 classes. Label files for respective datasets are prepared, in which each image is labeled with one of the 1000 classes. The pre-trained model VGG-16 is used, and the network structure configuration file and the like are those of the original VGG-16 model (downloadable from https://cloud6.pkuml.org/f/2a41fd0cbdc34d6d99d5/).

(2) Preprocessing all input images. First, the sizes of all the images are unified to be 224×224, by a resizing operation. Then, mean removal is performed, to remove, for each feature to be trained, the mean value across all training images from the feature. Finally, the features of the image are scaled to the same range by normalization, and the original image data is converted into a format supported by Gaffe.

Figure 2:
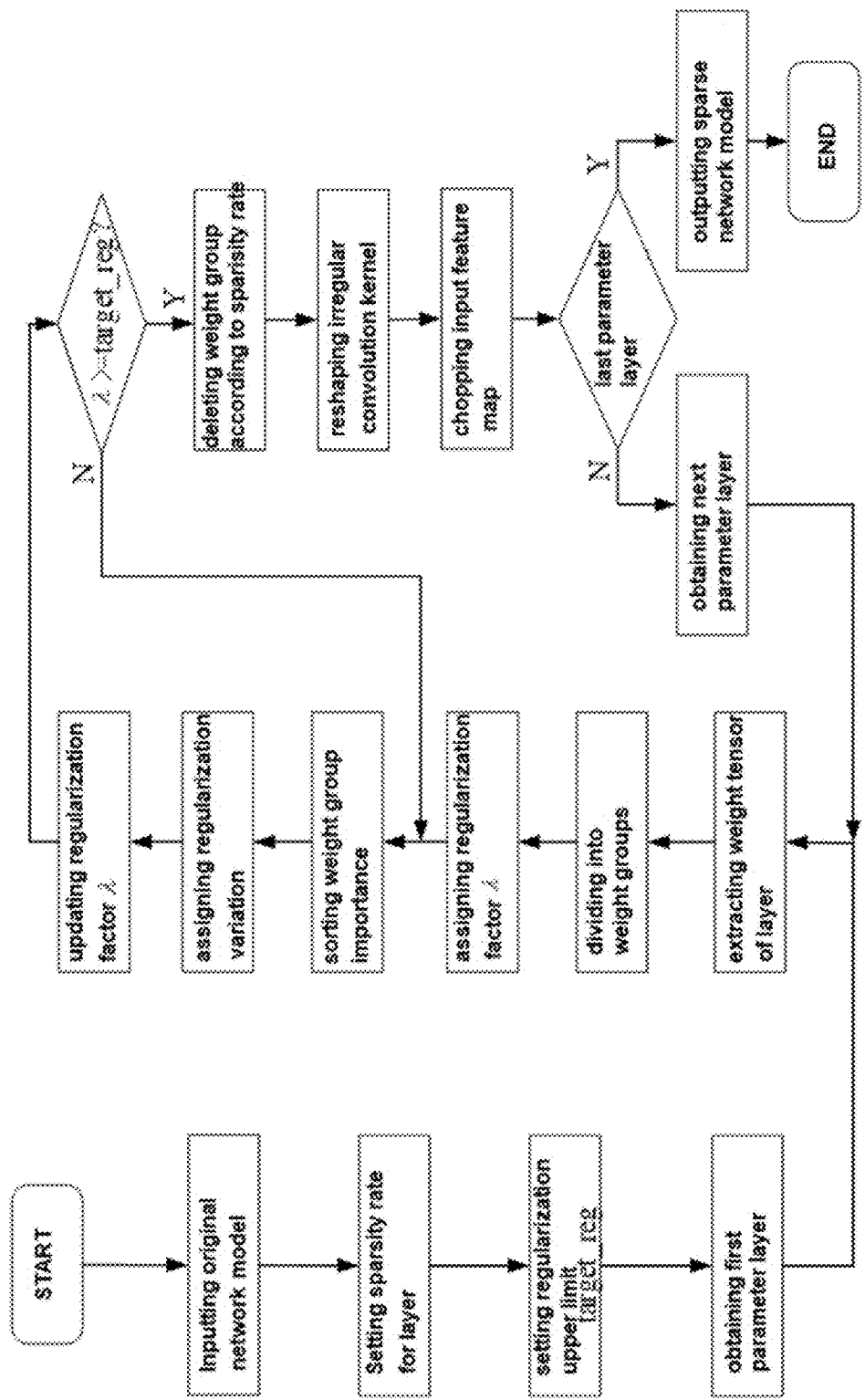
FIG. 2 is a flowchart illustrating the model sparsification according to an embodiment of the present disclosure.
Figure 3:
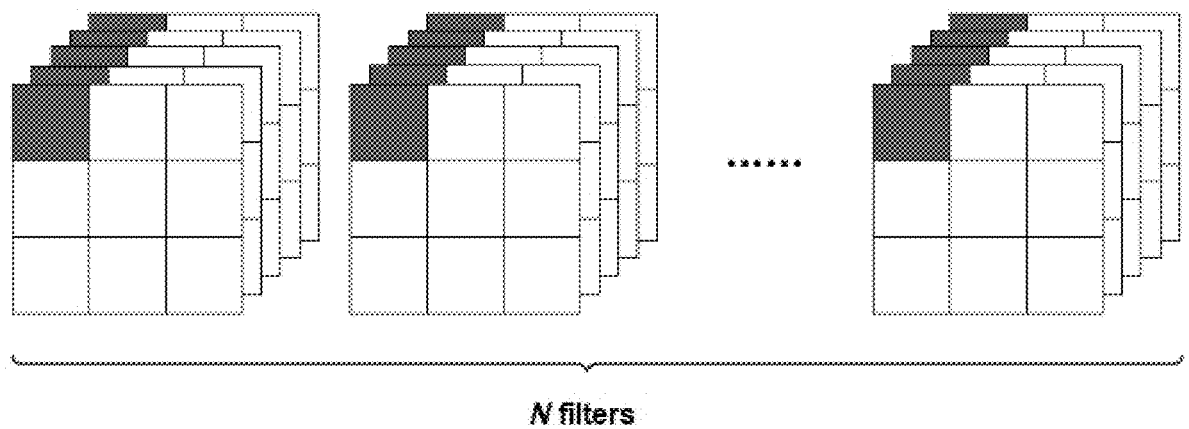
FIG. 3 shows the convolution kernel pruning according to an embodiment of the present disclosure.

(3) Iteratively training to learn the external features of each class, by using the pre-trained neural network model (VGG-16) as the original image classifier and inputting the pre-processed images from step (2) to the neural network in batches; and pruning the original network model during the training, to delete weights that do not affect classification accuracy, reduce computations and parameters of the network model and simplify the image classifier. A flow chart of the pruning of the network model is shown in FIG. 2, including the following steps:

(3.1) For each convolutional layer of the model, modeling a four-dimensional tensor $W_{N*C*H*W}$, where N is the number of convolution kernels, C is the number of channels of the convolution kernels, and H and W are the height and width of the convolution kernel respectively. Then, dividing the weights of the convolution kernels into weight groups according to the dimensions of H and W, so that weights (N, C, :, :) at the same spatial position in all the channels of all the convolution kernels in a convolutional layer are grouped into an independent weight group g. As shown in FIG. 3, the darkened position represents an example of a weight group, where a 3×3 convolution kernel can be divided into 9 weight groups in terms of spatial dimensions, and each weight group includes N*C weight parameters.

(3.2) According to a specified compression or speed-up ratio of the model, determining a target sparsity rate for each layer of the network model. In this experiment, when the specified speed-up ratio is 2, the target sparsity rate for each layer of the model is calculated and set to 0.35. Then, setting a uniform regularization upper limit target_reg to all the weight groups, and assigning a regularization factor $\lambda_g$ to each independent weight group where all $\lambda_g$ are initialized to 0.

(3.3) Setting hyper-parameters in the pruning algorithm, which mainly include three hyper-parameters: A and u in the centrally-symmetric continuous function, and the regularization upper limit target_reg of the weight groups. A and u represent the "fineness" of pruning. On the one hand, the smaller A is, the "finer" the pruning is and the smoother the pruning process is, thus giving the network more time to self-adjust and self-repair, and producing a better final result. On the other hand, A determines the total time of pruning. The smaller A is, the slower the regularization of the parameter groups increases, thus increasing the time of the whole pruning process. The effects of u are similar to A. Generally, u is fixed, A is set to half of the original weight decay, and target_reg is set to 1e4*A. In this experiment, in order to ensure the pruning result without increasing the pruning time by too much, u is fixed to 0.25, A is set to 0.00025, and target_reg is set to 2.5.

(3.4) Determining the order of removal of the weight groups in the network weight matrix according to the relative importance of them. In this experiment, L1-norm is used as a criterion to measure the importance of weights. At each iteration, the weight groups are sorted in ascending order according to L1-norm, to obtain a rank for each weight group. Then, an average rank across the first N iterations is calculated using $$\bar{r}_{avg} = \frac{1}{N}\sum_{n=1}^{M} r_n.$$

Finally, the average ranks $\bar{r}_{avg}$ are sorted again, to obtain an importance rank r for each weight group. In addition, this approach can easily be extended to using other criteria to measure the importance such as L2–norm and Taylor expansion.

Figure 4:
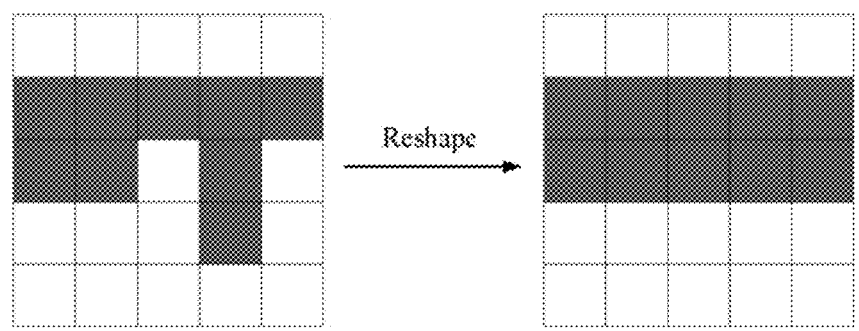
FIG. 4 shows the reshaping of an irregularly shaped sparse convolution kernel according to an embodiment of the present disclosure.

(3.5) In general, unimportant weights are penalized more. Assigning regularization variations $\Delta\lambda_g$, to respective weight groups, according to the importance rank r of each weight group obtained in (3.4) and using the centrally-symmetric continuous function $$\Delta\lambda_g(r) = \begin{cases} Ae^{-\alpha r} & r \leq N_c \\ 2uA - Ae^{-\alpha(2N_c - r)} & r > N_c \end{cases},$$

where r is the independent variable, $\Delta\lambda_g$ is the dependent variable. It can be seen that the higher the rank of a weight group is, the more important the weight group is, the less the corresponding penalty is, and the smaller the regularization variation assigned to the weight group is. On the other hand, the lower the rank of a weight group is, the less important the weight group is, the more the corresponding penalty is, and the larger the regularization variation assigned to the weight group is. Then, updating the regularization factor $\lambda_g$ of each weight group. At each iteration, the regularization factor $\lambda_g$ of each weight group is gradually updated by adding the regularization variation $\Delta\lambda_g$, of the weight group to its corresponding regularization factor, to obtain a new regularization factor $\lambda_g^{new}$ for each weight group. When $\lambda_g^{new}$ reaches the preset regularization upper limit target_reg, the corresponding parameter group will be deleted, to obtain a sparsified model. (3.6) Reshaping irregularly shaped sparse convolution kernels generated in the sparse model by spatial regularization. Regularly shaped sparse convolution kernels with the smallest differences from the irregularly shaped sparse convolution kernels are found using a function $V^{(i)} = \sum_{s=0}^{S} |M(s) - m^{(i)}(s)|$, where S is the number of weight groups, i.e., S=H×W. As shown in FIG. 4, a 5×5 convolution kernel can be divided into 25 weight groups in terms of spatial positions. In the left graph, the darkened positions represent the remaining weights after pruning; the blank positions represent the deleted weights. M(s) is the mask value of a spatial position s of an irregularly shaped sparse convolution kernel. $m^{(i)}(s)$ is the mask value of an i-th sub-rectangle at a spatial position s in a regularly shaped convolution kernel. In this experiment, the mask of the pruned position of the irregularly shaped sparse convolution kernel is set to 0, i.e., M(s)=0; and the mask of the unpruned position is set to 1, i.e., M(s)=1. For the regularly shaped convolution kernel in the right graph, assuming that there are a total of I sub-rectangles in the convolution kernel, there are 225 sub-rectangles in the 5×5 convolution kernel, i.e., I=225. The mask values of all spatial positions s of an i-th sub-rectangle in the regularly shaped convolution kernel are set to 1; and the mask values of the spatial positions outside the sub-rectangle in the large convolution kernel are set to 0. That is, with regard to the sub-rectangle in the darkened area of the right graph of FIG. 4, the darkened positions have $m^{(i)}(s)=1$ and the blank positions have $m^{(i)}(s)=0$. Finally, the corresponding regularly shaped sparse convolution kernels are found by minimizing $V^{(i)}$, and replace the irregularly shaped sparse convolution kernels, to achieve the reshaping of the irregularly shaped sparse convolution kernels.

Figure 5:
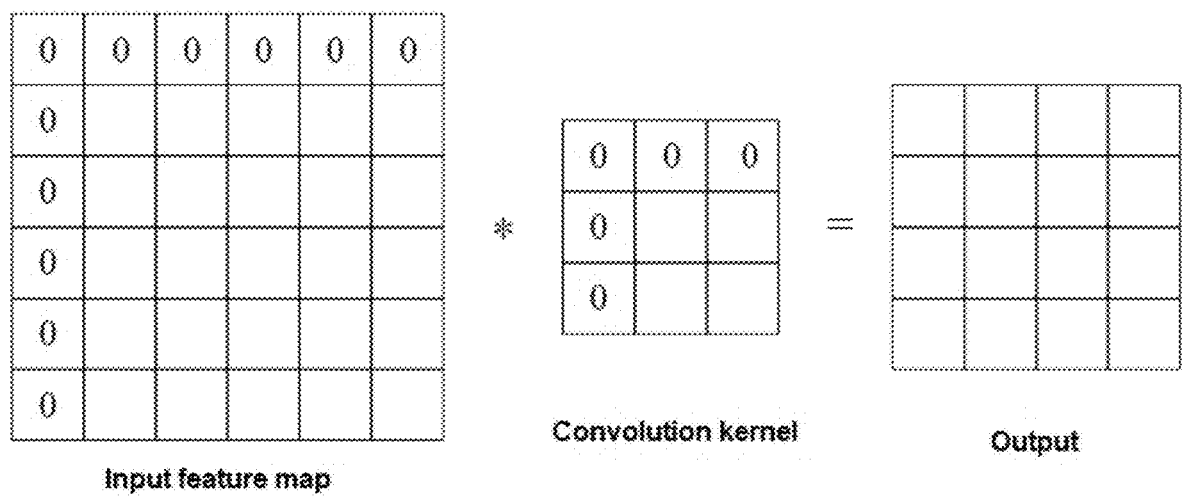
FIG. 5 shows the cropping of an input feature map according to an embodiment of the present disclosure.

(3.7) When the size of the convolution kernel is reduced from 3×3 to 2×2, although the size of the convolution kernel can be changed on a deep learning platform such as Gaffe to effectively speed up, the implementation process may change the size of the output feature map, and thus affect the calculation of convolution. In order to ensure that the size of the output feature map will not be affected by the change in the size of the convolution kernel, firstly, the regularly shaped sparse convolution kernel is divided into four directions in terms of spatial dimensions: upper, lower, left, and right. Similarly, the input feature map is divided into four directions in terms of spatial dimensions: upper, lower, left, and right. Then, according to the spatial-dimension directions of the deleted weights on the regularly shaped sparse convolution kernel, pixels of the input feature map in the corresponding directions are deleted. As shown in FIG. 5, weights of the 3×3 convolution kernel in the left and upper directions are deleted, to obtain a 2×2 convolution kernel; therefore, on the input feature map pixels in the left and upper directions are removed, to ensure that the size of the output feature map will not be changed.

(3.8) When the sparsity rate of a layer reaches the preset target sparsity rate, stopping automatically the spatial pruning of the layer; when all the layers reach their preset sparsity rates, determining completion of the pruning.

(4) Retraining the sparsified network model where the deleted weights are fixed and not updated, and the other parameters are iteratively trained; using a validation dataset to evaluate the image classification accuracy achieved by the model; when the image classification accuracy on the validation dataset by the retrained model no longer increases, stopping the retraining and outputting a sparse network model.

(5) Using the sparse network model as a new image classifier, to predict the labels of a new set of images and thus classify the new images. In this experiment, the new images are 5000 high-resolution images in a total of 1,000 classes from the ImageNet test set, the new image data is predicted and classified by the sparse network model, and a classification result is obtained.

Experimental results show that the original VGG-16 network model has a 90.1% classification accuracy on the ImageNet test set, the sparse network model simplified by the method of the present disclosure has a 90.3% classification accuracy on the ImageNet test set. At the same time, the running time of the sparse network model in image classification is nearly two times less than the original model, and uses storage resources about 30% less. Therefore, the present disclosure simplifies the image classifier by removing weights that do not affect classification accuracy, effectively reduces image classification time, significantly improves the efficiency of image classification, saves storage resources to a certain extent and produces a better classification result.

Embodiments are described in detail above to illustrate some specific methods of the present disclosure. It is noted that the present invention is not limited to the specific methods, and can be implemented without the specific methods. Any modification, equivalent, alternation made to the present disclosure by those skilled in the art shall fall within the scope of the invention.

What is claimed is:

1. An efficient image classification method based on structured pruning, comprising:
   (1) obtaining a training dataset and a test dataset of images; class-labeling images of the training dataset and the test dataset;
   (2) preprocessing all the images of the training dataset and the test dataset;
   (3) iteratively training, by using a pre-trained neural network model as an original image classifier and inputting the pre-processed images from step (2) to the neural network in batches; and pruning the original network model during the training, the pruning comprising the following steps:
      (3.1) for each convolutional layer of the model, modeling a four-dimensional tensor $W_{N*C*H*W}$, where N is the number of convolution kernels, C is the number of channels of the convolution kernels, and H and W are the height and width of the convolution kernel respectively;
      (3.2) dividing the weights of the convolution kernels into weight groups according to the dimensions of H and W, so that weights at the same spatial position in all the channels of all the convolution kernels in a convolutional layer are grouped into an independent weight group g;
      (3.3) according to a user-specified compression or speed-up ratio of the model, determining a target sparsity rate for each layer of the network model; setting a uniform regularization upper limit target_reg to all the weight groups, and assigning a regularization factor $\lambda_g$ to each independent weight group where all $\lambda_g$ are initialized to 0;
      (3.4) setting a criterion to measure a sparsity importance of each weight group in the network weight matrix; sorting the weight groups in ascending order according to the criterion and obtaining an importance rank for each weight group;
      (3.5) gradually assigning regularization variations $\Delta\lambda_g$ to respective weight groups, according to the importance rank of each weight group g; continuously updating the regularization factor $\lambda_g$ of each weight group; permanently deleting weights of a weight group when a regularization factor $\lambda_g$ of the weight group reaches the preset regularization upper limit target_reg;
      (3.6) reshaping irregularly shaped sparse convolution kernels obtained from the spatial pruning into regular sparse convolution kernels by spatial regularization;
      (3.7) deleting pixels on an input feature map in the same directions as the deleted weights on the regular sparse convolution kernels, to ensure the size of an output feature map is not changed;
      (3.8) when a sparsity rate of a layer reaches the preset target sparsity rate, stopping automatically the regularization pruning of the layer; when all the layers reach their preset sparsity rates, determining completion of the pruning;
   (4) retraining the sparsified network model where the deleted weights are fixed and not updated, and the other parameters are iteratively trained; when image classification accuracy of the retrained model no longer increases, stopping the retraining and outputting a sparse network model;
   (5) using the sparse network model as a new image classifier, to predict class-labels of the test dataset and thus classify the new images.

2. The method according to claim 1, wherein the preprocessing of step (2) comprises:
   first, unifying the sizes of all the images to 224×224, by a resizing operation;
   then, performing mean removal, to remove, for each feature to be trained, a mean value across all training images from the feature;
   finally, scaling features of the images to a same range by normalization.

3. The method according to claim 1, wherein step (3.2) comprises:
   dividing into weight groups according to the two dimensions, height H and width W, of the convolution kernel of the four-dimensional tensor, so that weights (N, C, :, :) at the same spatial position in all the channels of all the convolution kernels are grouped into an independent weight group, totaling H*W weight groups.

4. The method according to claim 1, wherein the determining a target sparsity rate for each layer of the network model in step (3.3) comprises:
   when a parameter compression ratio of the model is specified, first calculating the number of parameters N*C*H*W for each parameter layer and the total number of parameters P of the model, calculating a ratio $\alpha_l$ of the number of parameters of a layer to the total number of parameters for each layer;
   then, calculating the number of parameters to be removed P' from the model according to the preset compression ratio, calculating the number of parameters to be removed $P_l'$ for each layer using $\alpha_l*P'$, to obtain the target sparsity rate for each layer of the network model;
   similarly, when a speed-up ratio of the model is specified, first calculating a floating point operations per second (GFLOPs) for each layer and a total GFLOPs of the model;
   then determining a GFLOPs to be reduced for the model according to the specified speed-up ratio, calculating a GFLOPs to be reduced for each layer, to obtain the target sparsity rate for each layer.

5. The method according to claim 1, wherein the criterion to measure a sparsity importance in step (3.4) is averaged L1−norm; and at each iteration, the weight groups are sorted in ascending order according to L1−norm, then, an average rank across the first N iterations is calculated using a function $$\bar{r}_{avg} = \frac{1}{N}\sum_{n=1}^{M} r_n,$$

and the average ranks $\bar{r}_{avg}$ are sorted again, to obtain a final importance rank r for each weight group.

6. The method according to claim 5, wherein the assigning regularization variations $\Delta\lambda_g$ in step (3.5) comprises:
   determining regularization variations of respective weight groups according to the importance rank r,
   assigning regularization variations $\Delta\lambda_g$ to respective weight groups using the centrally-symmetric continuous function $$\Delta\lambda_g(r) = \begin{cases} Ae^{-ar} & r \le N_c \\ 2uA - Ae^{-a(2N_c - r)} & r > N_c \end{cases},$$

where A and u are manually-set hyper-parameters, representing the penalty that a weight group with the lowest rank obtained from a sorting receives and the ratio of the penalty that a weight group with a threshold rank $RN_g$ receives to A; $\alpha$ and $N_c$ are known parameters where a represents the curvature of the function curve, obtainable using the equation $$\alpha = \frac{\log(2) - \log(u)}{RN_g},$$

$N_c$ represents the center of symmetry of the function, obtainable using the equation $$N_c = -\frac{\log(u)}{\alpha}.$$

7. The method according to claim 6, wherein the updating the regularization factor $\lambda_g$ in step (3.5) comprises:
at each iteration, gradually updating the regularization factor $\lambda_g$ of each weight group by adding the regularization variation $\Delta\lambda_g$ of the weight group to its corresponding regularization factor, to obtain a new regularization factor $\lambda_g^{new}$ for each weight group;
when $\lambda_g^{new}$ reaches the preset regularization upper limit target_reg, deleting the corresponding parameter group, to obtain a sparsified model.

8. The method according to claim 7, wherein the spatial regularization in step (3.6) comprises:
for an irregularly shaped sparse convolution kernel generated in the sparse model, reshaping the irregularly shaped sparse convolution kernel by finding a regularly shaped sparse convolution kernel with the smallest difference from the irregularly shaped sparse convolution kernel using a function $V^{(i)} = \Sigma_{s=0}^{S} |M(s) - m^{(i)}(s)|$, where S is the number of weight groups, i.e., $S = H \times W$, $M(s)$ is the mask value of a spatial position s of the irregularly shaped sparse convolution kernel, and $m^{(i)}(s)$ is the mask value of an i-th sub-rectangle at a spatial position s in a regularly shaped convolution kernel,
wherein the corresponding regularly shaped sparse convolution kernel is found by minimizing $V^{(i)}$.

9. The method according to claim 8, wherein step (3.7) comprises:
dividing the regularly shaped sparse convolution kernel into four directions in terms of spatial dimensions: upper, lower, left, and right; similarly, dividing the input feature map into four directions in terms of spatial dimensions: upper, lower, left, and right;
then, according to spatial-dimension directions of the deleted weights on the regularly shaped sparse convolution kernel, deleting pixels of the input feature map in the corresponding directions, so that the size of the output feature map is not changed.

10. The method according to claim 1, wherein step (4) comprises:
for the sparsified network, labeling weights in the deleted weight groups by mask, and mask-labeling weight gradients of corresponding weight groups in back-propagation to ensure that in the retraining the weights in the deleted weight groups are not updated, and weights in the rest weight groups are iteratively updated; and
during the training, evaluating an accuracy achieved by the model, and stopping the retraining and outputting a sparse network model with a highest accuracy when the accuracy by the retrained model no longer increases.

* * * * *